United States Patent [19]
Fleagle

[11] 3,998,298
[45] Dec. 21, 1976

[54] ANTILOCK SENSOR ASSEMBLY

[75] Inventor: Joseph Edgar Fleagle, St. Louis County, Mo.

[73] Assignee: Wagner Electric Corporation, Parsippany, N.J.

[22] Filed: Oct. 28, 1975

[21] Appl. No.: 626,500

[52] U.S. Cl. .................... 188/181 R; 310/168
[51] Int. Cl.² ............................ B60T 8/00
[58] Field of Search ........... 73/488, 493, 494, 518, 73/519; 188/181 R, 181 A; 303/21; 310/75 R, 168–170; 324/166, 174

[56] References Cited
UNITED STATES PATENTS

| | | | |
|---|---|---|---|
| 3,017,145 | 1/1962 | Yarber | 303/21 BE |
| 3,659,904 | 5/1972 | Stevens | 303/21 CF X |
| 3,887,046 | 6/1975 | Bueler | 188/181 A |
| 3,910,386 | 10/1975 | Stigall et al. | 188/181 R |
| 3,916,234 | 10/1975 | Stigall et al. | 310/168 X |

Primary Examiner—Stephen G. Kunin
Attorney, Agent, or Firm—James R. Bell

[57] ABSTRACT

A vehicle wheel speed sensor includes a rotor and a stator. The rotor is annularly provided to rotate adjacent and relative to an axle. The stator is mounted on the axle. A point sensor is included in the stator for providing pole pieces 180° diametrically opposed and directed radially outwardly toward and in radial alignment with the annular rotor for proximate electrical association therewith.

7 Claims, 6 Drawing Figures

U.S. Patent  Dec. 21, 1976  Sheet 3 of 3  3,998,298

ANTILOCK SENSOR ASSEMBLY

CROSS-REFERENCE TO RELATED APPLICTIONS

This invention discloses technological advances over the sensor assembly disclosed in application Ser. No. 480,864 filed on June 19, 1974, a continuation of application Ser. No. 363,604 filed on May 24, 1973, now abandoned, by Donald R. Stigall and Richard C. Bueler entitled "Vehicle Wheel Speed Sensor", which matured into U.S. Pat. No. 3,916,234 issued on Oct. 28,1975; to the sensor assembly disclosed in application Ser. No. 470,947 filed on May 17, 1974 by Richard C. Bueler entitled "Antilock Sensor Assembly" which matured into U.S. Pat. No. 3,887,046 issued on June 3, 1975; and to the sensor assembly disclosed in appliction Ser. No. 508,244 filed on Sept. 23, 1974 by Donald R. Stigall and Richard C. Bueler entitled "Antilock Sensor Assembly" which matured into U.S. Pat. No. 3,910,386 issued on Oct. 7, 1975, each of the above being assigned to the assignee of the present invention. This invention advantageously may incorporate the sensor mounting assemblies disclosed and claimed in the above-mentioned related applications and any patents which have issued or may issue thereon and are hereby incorporated by reference into the present application.

BACKGROUND OF THE INVENTION

1. Field Of The Invention

This invention relates generally to fluid pressure brake and analogous systems and more specifically to those of the inertia control type including brake system control by plural cooperating sensing means producing a single signal.

2. Description Of The Prior Art

Vehicle wheel speed sensors are generally of two basic types. One type includes those having a rotor and stator with axial spacing therebetween and another type includes those having a rotor and stator with radial spacing therebetween. The axially spaced rotor-stator can be further divided into those which are commonly referred to as point sensors and those which include a continuous sensing arrangement. The continuous sensing arrangement has recently been extended to the radially spaced rotor-stator.

A critical area of concern in such sensors is guarding signal irregularities caused by variations in the spacing between the rotor and stator. Such variations are due to inherent axial and radial flexures and oscillations as the wheel rotates about the axle resulting in flexures and oscillations as the rotor relative to the stator. Many sensor arrangements have attempted to overcome this problem.

One such sensor is disclosed in U.S. Pat. No. 3,683,219. This sensor can generally be classified as an axially spaced rotor-stator arrangement of the continuous sensing type. That is, the rotor and stator are in continuous annular electrical relationship as the annular rotor rotates relative to an annular stator. To overcome the problem of rotor-stator spacing variations, U.S. Pat. No. 3,683,219 axially spaces its tooth stator and rotor members with countercontacting friction bearing coatings urged into contact by a resilient member. However, there would appear to be undesirable wear and temperature problems associated with such countercontacting arrangements.

Another approach is disclosed in U.S. Pat. No. 3,812,391. The sensor of this patent can generally be classified as an axially spaced rotor-stator arrangement of the point sensor type. That is, a stator and rotor are in electrical association at a point during rotation of the rotor where the annular rotor passes in proximity to a stator unit mounted on an axle. To overcome the problem of rotor-stator spacing variations, U.S. Pat. No. 3,812,391 restricts axial flexure of the rotor by guiding that rotor between fixed guides axially spaced apart slightly more than the rotor thickness. Such arrangement appears to permit axial flexures and oscillations although limited by the guides.

As a result of the flexure of the oscillation problems of the axially spaced sensor devices, radially spaced rotor-stator arrangements have been disclosed. One such approach to radially spaced sensors is disclosed in U.S. Pat. No. 3,626,226 wherein a point type sensor is in radially spaced electrical association with a rotor at a point during rotation of the rotor where the annular rotor passes in proximity to a stator unit. However, radial flexures and oscillations would appear to cause the aforementioned signal variations.

An apparent satisfactory solution to sensor flexure problems would appear to be disclosed in radially spaced sensors wherein there is a continuous electrical association between an annular rotor and stator such as that described in the above-mentioned, cross-referenced, related applications. In such radially spaced sensors, the concentric association between rotor and stator are self-compensating inasmuch as radial flexures which cause a decrease in radial spacing at any point between rotor and stator cause a corresponding inherent increase in radial spacing at a point 180° diametrically opposed to the point of decrease. Thus signal variations caused by the decreased spacing are countered by compensating signal variations caused by the inherent increased spacing.

Although radially spaced continuous sensors appear continuous sensors are generally necessarily more complex and expensive than point type sensors. It would therefore be advantageous to have a novel point sensor of the radially spaced type providing the advantages of simplicity, economy and self-compensating reliability.

SUMMARY OF THE INVENTION

Accordingly, the present invention discloses a unique self-compensating radially spaced radially point sensor arrangement. The foregoing is accomplished by providing a vehicle wheel sensor including a rotor annularly associated with a hub for rotation relative to an axle. A stator is mounted on the axle and includes a point sensor having pole pieces 180° diametrically opposed and directed radially outwardly toward and in radial alignment with the annular rotor for proximate electrical association therewith. The point sensor may be accommodated on the axle by a stator mounting ring. The point sensor may include an elongated cartridge having pole pieces exposed at opposite ends thereof so as to be 180° diametrically opposed having a coil annularly associated with each pole piece and a magnet interconnecting the pole pieces. Also, two point sensor cartridges may be provided on the stator ring including pole pieces exposed at one end thereof so that the pole pieces exposed at one end thereof so that pole pieces are 180° diamatrically opposed. Each cartridge includes a coil annularly associated with the pole piece and a magnet in abutting relationship with the pole piece. In either case, the single elongated cartridge or the two individual cartridges, the pole piece, coil means and magnetic element are encapsulated in relatively fixed relationship within the cartridge by a nonconductive synthetic material such as a suitable plasticized or rubberized compound.

The above and further novel features of the invention will appear more fully from the following detailed description when read in connection with the accompanying drawings.

BRIEF DESCRIPTION OF THE DRAWINGS

In the drawings wherein like parts are marked alike.

DESCRIPTION OF THE PREFERRED EMBODIMENT

Figure 1:
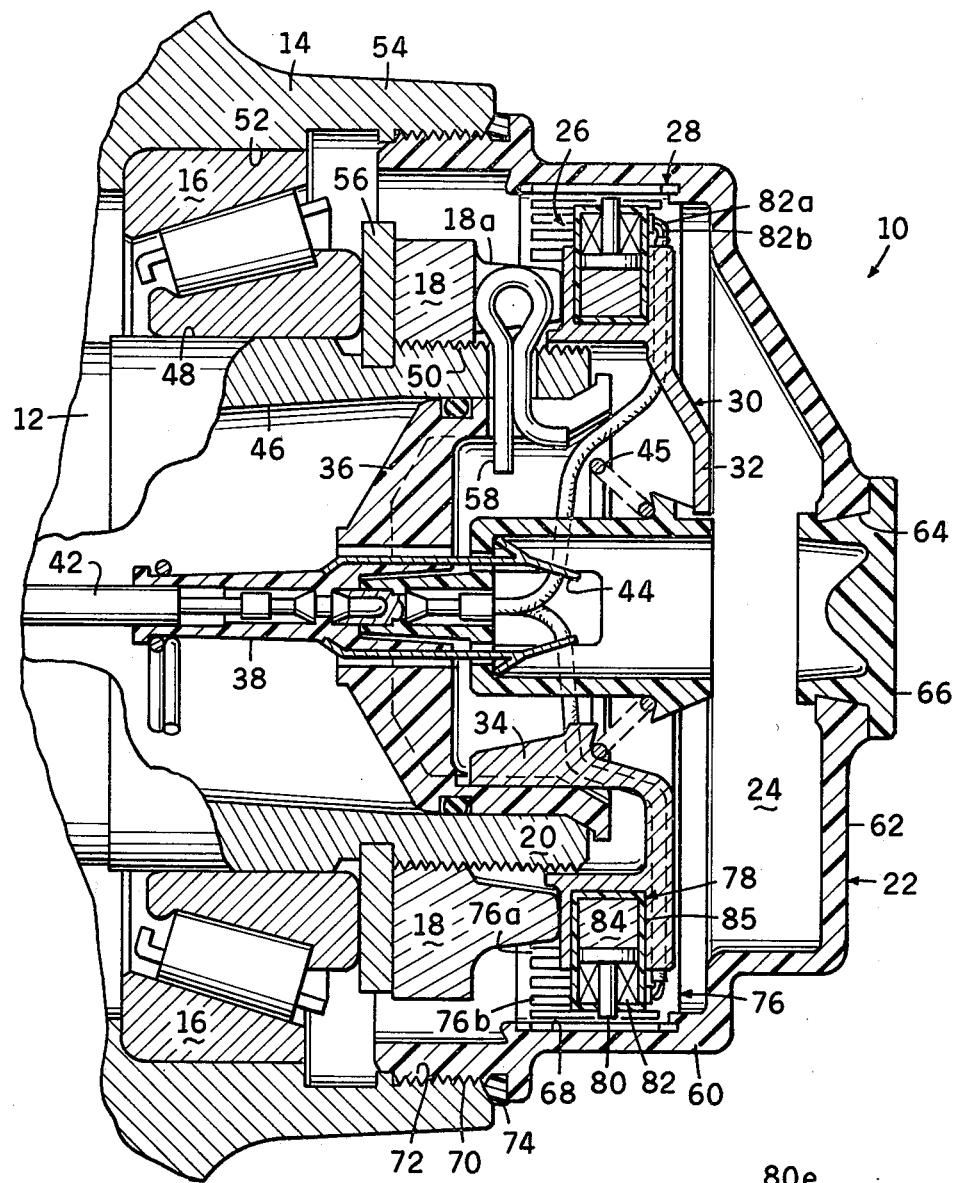
FIG. 1 is a cross-sectinal side elevation illustrating a plurality of point sensors mounted on a stator and diametrically opposed for exposure in radial spaced relationship with a rotor.

Referring now to the drawings, FIG. 1 illustrates the novel antilock sensor assembly of this invention generally designated 10. Generally cylindrical hollow axle 12 has vehicle wheel 14 rotatably mounted thereon. Wheel bearing 16 is disposed between wheel 14 and axle 12, and wheel bearing retaining nut 18 is threadedly received on a free end portion 20 of the axle for retaining the bearing in place. Hub cap 22 is threadedly engaged with wheel 14 enclosing lubricating chamber 24 which holds lubricant for bearing 16. An electrical sensor is generally shown at 26 as a means for generating a varying electrical signal to control actuation of the logic portion of a vehicle antilock brake system or the like (not shown), and includes a rotor 28 which comprises hub cap 22 and associated components parts, as described hereinafter, and stator 30 adjacent nut 18 which also retains bearing 16 in place, as previously mentioned. Stator 30 has a generally annular stator mounting ring 32 carrying a first portion of the means generating the varying electrical signal. Rotor 28 carries a second portion of the means generating the signal. Ring 32 includes protruding members 34 for mounting the ring on the axle in a predetermined radial orientation. Also, the assembly incudes an insert 36 mounted on and extending into axle 12 for receiving ring 32 and for accommodating electrical connection with a logic system. Ring 32 can then be mounted on insert 36 in a predetermined radial orientation therewith for electrically connecting sensor 26 with the logic system and for securing stator ring 32 for limited relative movement with respect to the rotor. Means such as first and second electrical connectors 38, 40, respectively, are mounted in insert 36 for providing electrical connection between sensor 26 and the logic system via cable 42. Connectors 38, 40 are anchored in relative electrical connection by anchor means 44. Resilient members or compression spring 45 resiliently interconnects ring 32 and insert 36 via the electrical connectors 38, 40. Mounting of ring 32 on insert 36 and the associated electrical connectors 38, 40 and anchor 44 are adequately described in related application Ser. No. 470,947.

More particularly, axle 12 is hollow, having an axially extending bore 46 which opens into the free end portion 20 of the axle, and a peripheral surface 48 of axle 12 is threaded at 50. Anti-friction or wheel bearing 16, of a type well known in the art, is rotatably positioned in engagement between axle peripheral surface 48 and a cooperating annular surface 52 of wheel hub 54. Bearing retaining nut 18 is threadedly received on threaded portion 50 and engaged with a spacer washer or shim 56 to maintain the bearing in place. The interferring engagement of a cotter key 58 between axle 12, insert 36 and adjacent nut extensions 18a maintains nut 18 in its assembled position on axle threads 50 and maintains insert 36 within axle 12 from rightward movement, as shown in FIG. 1.

Hub cap 22, which is a type well known in the art and formed of either a nonferrous metal or a plastic, is generally cup-shaped having an annular sidewall 60 integratedly formed with base wall 62. A lubricant filler hole 64 is centrally provided in the base wall in which an insertable sealing plug 66 is received. Axially extending bore 68 is provided in hub cap sidewall 60 and peripheral threads 70 are provided on sidewall 60 for threaded engagement with cooperating thread 72 provided in the rightward or open end of wheel hub 54. An O-ring type seal 74 is carried on hub cap sidewall 60 in sealing engagement with wheel hub 54 to seal lubrication chamber 24.

Sensor 26 is provided with stator portion 30 comprising annular stator mounting ring 32 of nonferrous metal or other nonmagnetic or a synthetic material. Ring 32 is provided to carry a first portion of the means generating the varying electrical signal which comprises point sensor means generally designated 78, including elements such as pole pieces 80, coil means 82 and magnet means 84. The point sensors and included elements are encapsulated in a suitable synthetic material 85 into a cartridge or similar configuration and mounted on the ring 32 so that the pole pieces are 180° diametrically opposed and directed radially outwardly toward and in radial alignment with annular rotor 28 for radially spaced proximate electrical association therewith.

Rotor 28 carries a second portion of the means generating the varying electrical signal and comprises hub cap 22, previously described, which carries ferrous ladder or track 76 stamped from substantially planar ferrous metal sheets. Ladder 76 includes equally spaced alternating rung portions 76a and slot portions 76b and is annularly mounted in bore 60 of hub cap 22 thus comprising the rotor portion 28 of sensor 26.

Stator Mounting Ring

Figure 2:
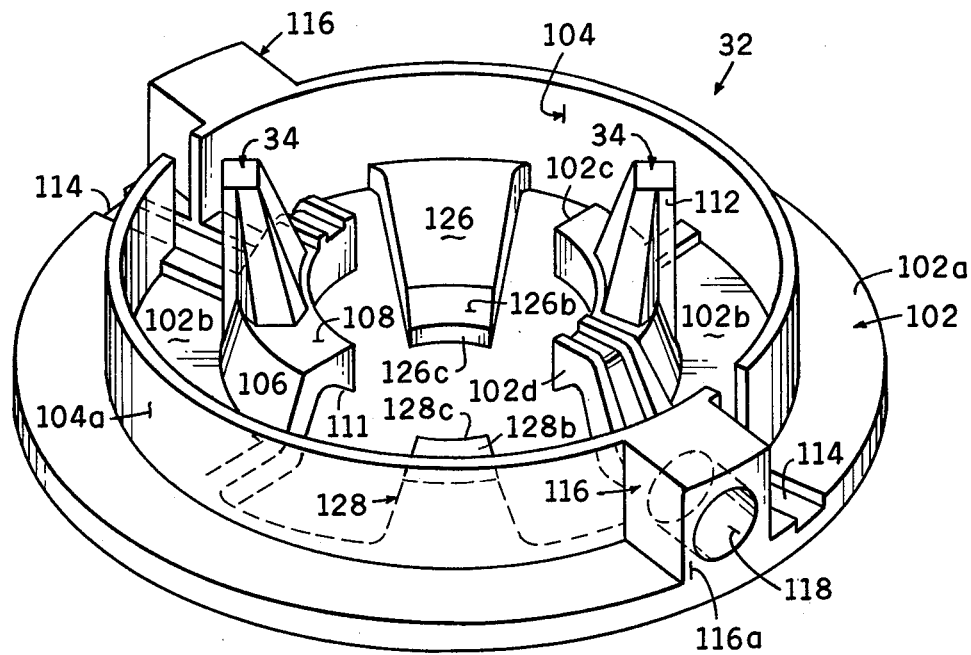
FIG. 2 is an isometric illustration of the stator mounting ring for mounting the point sensors of FIG. 1.

FIG. 2 illustrates stator ring 32 which is generally annular in configuration and preferably comprises a cast nonferrous metal or other nonmagnetic or a synthetic material. Ring 32 generally comprises a main radial portion 102 integratedly formed with a main axially extending portion 104. Radial portion 102 includes first or outboard portion 102a which extends radially outwardly from axial portion 104, and second or inboard portions 102b which extend radially inwardly from axial portion 104. However, it is shown that whereas outboard portion 102a is a continuous radial portion, inboard portions 102b are segmented radial portions terminating at ends 102c and 102d.

Inboard portions 102b are integratedly formed to include incline 106 terminating in a land portion 108. Protruding from the incline and land portions 106, 108, respectively, of inboard portions 102b are protrusions 34 appropriately formed to include a keyed portion 112 for mounting ring 32 in a predetermined radial orientation on axle 12. Segmented annular lip portions 111 are formed under land 108 and incline 106 as shown in the drawings. Also, integratedly formed with inboard portions 102b are canal-like impressions 114 provided to guide electrical conduit from coil 82 to the electrical connectors to be discussed later in greater detail. Canals 114 extend from land 108 along incline 106 and across inboard and outboard portons 102a, 102b, respectively, interrupting axially extending portin 104.

Integratedly formed with radially extending portion 102 and axially extending portion 104 are generally rectangular mounting portions 116 including annular recesses 118 formed therein. Portions 116 are 180° diametrically opposed and abut outboard portion 102a of radially extending portion 102 and surface 104a of axially extending portion 104. Portions 116 extend radially outwardly from surface 104a and terminate at surface 116a thereof. Recesses 118 are formed in surface 116a and extend radially toward and terminate at surface 104a.

Extensions 126, 128 are integratedly formed with ring 32 and extend radially inwardly from axially extending portion 104 at inclined portion 126a, 128a, respectively and continue into radial lands 126b, 128b, respectively. Extensions 126, 128 terminate at 126c, 128c, respectively.

Point Sensors

Figure 3:
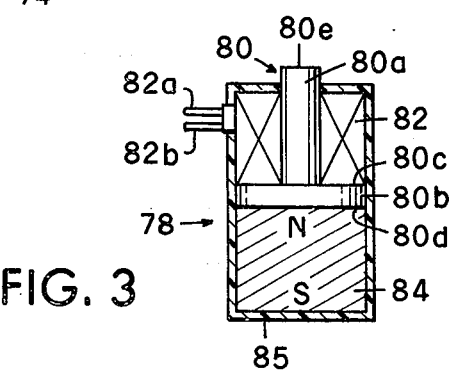
FIG. 3 is a cross-sectional side elvation of one of the point sensor cartridges are utilized in the stator of FIG. 1.

Point sensors 78, FIGS. 1 and 3 are of a type well known and are commercially available. In the figures it can be seen that each point sensor 78 includes a pole piece 80 including a generally cylindrically shaped radially extending portion 80a integratedly formed with and normal to disk portion 80b. Coil 82 is annularly provided about portion 80a abutting outer radial face 80c of disk portion 80b whereas generally cylindrical magnet 84 abuts inner radial face 80d of disk portion 80b. The north pole designated N of each magnet 84 is in abutting relationship with disk face 80d whereas the south pole designated S of each magnet is at an opposed end of the magnet 84. A nonconductive synthetic coating 85 encapsulates sensor 78 except for pole piece and 80e which protrudes radially outwardly from the sensor so as to be directed toward and in radial alignment with the annular rotor 28 for electrical associated therewith. Coil 82 protrudes through coating 85 at 82a, 82b and may be extended along canals 114 for electrical connection at connector 40.

Figure 4:
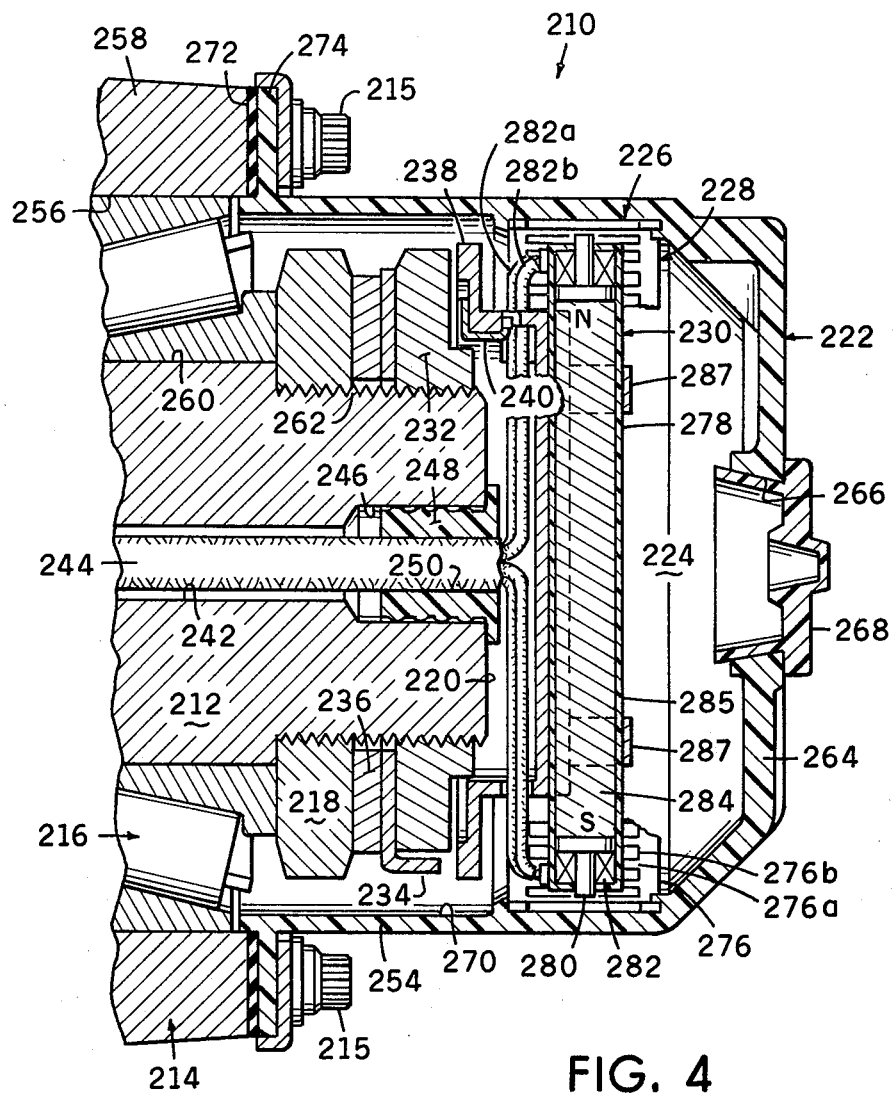
FIG. 4 is a cross-sectional side elevation illustrating a single point mounted on a stator including ends diametrically opposed for exposure in radial spaced relationship with a rotor.

FIG. 4 illustrates another embodiment of this invention. A novel antilock sensor assembly is generally designated 210. Generally cylindrical axle 212 has vehicle wheel 214 rotatably mounted thereon. Wheel bearing 216 is disposed between wheel 214 and axle 212, and wheel bearing retaining nut 218 is threadedly received on free end portion 200 of the axle for retaining the bearing in place. Hub cap 222 is preferably engaged with wheel 214 by bolts 215 enclosing lubricating chamber 224 which holds lubricant for bearing 216. An electrical sensor is generally shown at 226 as a means for generating a varying electrical signal to control actuation of a logic portion (not shown) of a vehicle antilock brake system or the like, and includes a rotor 228 which comprises hub cap 222 and associated component parts, as described hereinafter, and stator 230 adjacent end portion 220 which accommodates locknut 232, lockwasher 234, shim 236 and nut 218 which also retains bearing 216 in place, as previously mentioned. Stator 230 has a generally annular stator mounting ring 238 carrying a first portion of the means generating the varying electrical signal. Rotor 228 carries a second portion of the means generating the signal. Also, the assembly includes a retainer 240 mounted intermediate of the axle free end 220 and ring 238 for engaging and retaining the ring on the axle in a predetermined radial and axial orientation therewith as adequately described in related application Ser. No. 508,244. A cylindrical bore 242 is provided in axle 212 to guide cable 244 from the logic system to make electrical connection with sensor 226. Bore 242 terminates at free end 220 of axle 212 at receptacle 246 for accommodating grommet 248. The grommet includes opening 250 for further guiding and positioning of cable 244 with respect to its path from the logic system to the sensor. Cable 244 terminates adjacent sensor 226 at point sensor 278 mounted on ring 238 via coil connectors 282a, 282b.

More particularly, a peripheral surface 260 of axle 212 is threaded at 262. Antifriction or wheel bearing 216, of a type well known in the art, is rotatably positioned in engagement between axle peripheral surface 260 and cooperating annular surface 256 of wheel hub 258. Bearing retaining nut 218 is threadedly received on threaded portion 262 to maintain the bearing in place. Lockwasher 234 and locknut 232 maintain nut 218 in its assembled position on axle threads 262.

Hub cap 222, which is a type well known in the art and formed of either a nonferrous metal or a synthetic material, is generally cup-shaped having an annular sidewall 254 integratedly formed with base wall 264. A lubricant filler hole 266 is centrally provided in the base wall in which an insertable sealing plug 268 is received. Axially extending bore 270 is provided in hub cap sidewall 254. A gasket type seal 272 is positioned between hub cap flange 74 and wheel hub 258 to seal lubrication chamber 224.

Figure 5:
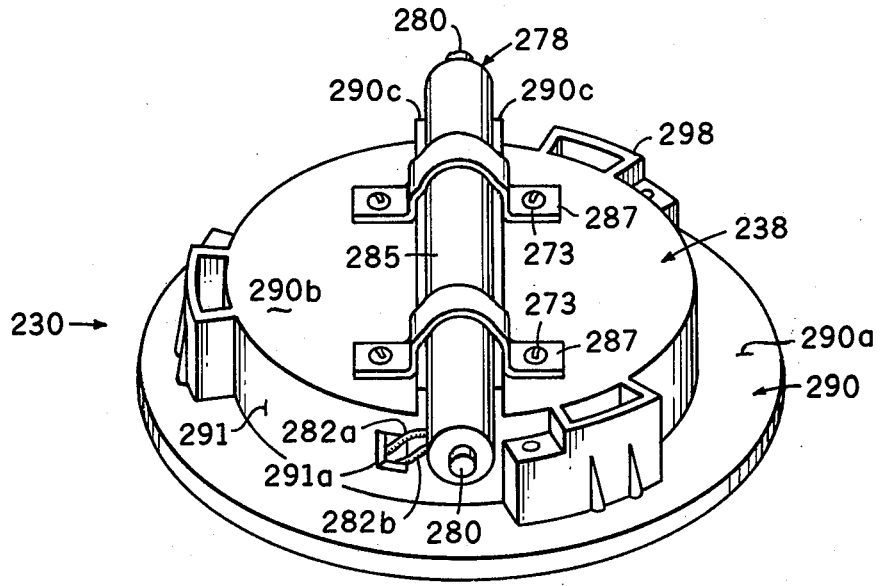
FIG. 5 is an isometric illustration of the stator mounting ring for mounting the point sensor f FIG. 4.

Sensor 226 is provided with stator portion 230 comprising annular stator mounting ring 238 of nonferrous metal or other nonmagnetic or a synthetic material, FIGS. 4 and 5. Ring 238 is provided to carry a first portion of the means generating the varying electrical signal which comprises point sensor means generally designated 278 including elements such as pole pieces 280, coil means 282 and magnet means 284. The point sensor and included elements are encapsulated in a suitable synthetic material 285 into a cartridge or similar configuration and mounted on the ring 238 by straps 287 so that the pole pieces are 180° diametrically opposed and directed radially outwardly toward and in radial alignment with annular rotor 228 for radially spaced proximate electrical association therewith.

Rotor 228 carries a second portion of the means generating the varying electrical signal and comprises hub cap 222, previously described, which carries ferrous ladder or track 276 stamped from substantially planar ferrous metal sheets. Ladder 276 includes equally spaced alternating rung portions 276a and slot portions 276b and is annularly mounted in bore 270 of hub cap 222 thus comprising the rotor portion 228 of sensor 226.

Stator Mounting Ring

Stator mounting ring 238, FIGS. 4 and 5 is generally annular and is provided for mounting stator 230 on axle 212 and for carrying a first portion of a varying electrical signal generating means and is preferably cast from a suitable nonferrous alloy or other nonmagnetic alloy or a synthetic material Ring 238 generally comprises a main radial portion 290 integratedly formed with a main axially extending portion 291. Main radial portion 290 includes outboard radial portion 290a which extends radially outwardly from axial portion 291, and inboard radial portion 290b axially offset from and extending radially inwardly from main axial portion 291. As a result, ring 238 has a generally stepped radial surface appearance due to the axially spaced radial portions 290a and 290b. Further included in ring 238 are substantially parallel raised lip portions 290c for providing guides for point sensor 278. Straps 287 are appropriately formed to secure sensor 278 between lip portions 290c and the straps are removably secured to radial portion 290b by screws 273. Apertures 291a are formed in axial portion 291 to permit passage of leads 282a, 282b from sensor 278 to cable 244.

Integratedly formed with outboard radial portion 290a and annular axial portion 291 are a plurality of generally keystone shaped locating bosses 298. As described in the related incorporated application Ser. No. 508,244, means are keyed for receiving, engaging and retaining ring 238 on retainer 240 in a predetermined radial and axial orientation with axle 212.

Elongated Point Sensor

Figure 6:
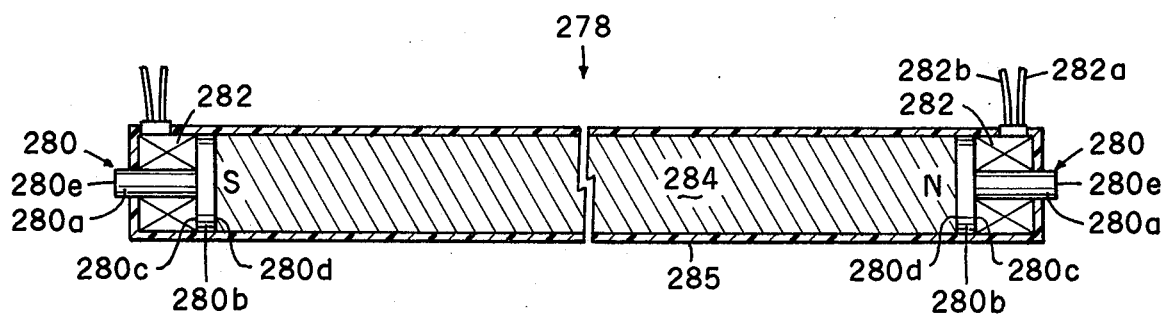
FIG. 6 is a cross-sectional side elevation of the point sensor cartridge as utilized in the stator of FIG. 4.

Point sensor 278, FIGS. 5 and 6, is of a type well known and is commercially available. In the figures it can be seen that elongated point sensor 278 includes a pole piece 280 at each end thereof. Each pole piece 280 includes a generally cylindrically shaped radially extending portion 280a integratedly formed with and normal to disk portion 208b. In this manner, the pole pieces are 180° diametrically opposed and directed radially outwardly toward and in radial alignment with annular rotor 228 for electrical association therewith. Each coil 282 is annularly provided about portion 280a abutting outer radial face 280c of disk portion 280b whereas generally cylindrical magnet 284 abuts each inner radial face 280d of disk portion 280b. The north pole designated N of magnet 284 is in abutting relationship with disk face 280d of one of the pole pieces whereas the south pole designated S of the magnet is in abutting relationship with disk face 280d of the other of the pole pieces. A nonconductive synthetic coating 285 encapsulates sensor 278 except for pole piece end 280e which protrudes radially outwardly from the sensor for the aforesaid 180° radially opposed direction.

OPERATION

With the stator mounting ring 32 as illustrated in FIG. 2, a point sensor cartridge 78 of the type illustrated in FIG. 3, can be secured into each recess 118 so that pole pieces 80 are 180° diametrically opposed and, as further illustrated in FIG. 1, when ring 32 is mounted on axle 12, the pole pieces are directly radially outwardly toward and in simultaneous radial alignment with either rungs 76a or slots 76b of ladder portion 76 of the annular rotor 28 with hub cap 22 secured on wheel 14. Coil leads 82a, 82b are directed along canals 114 to the electrical connector 40 for ultimate connection to a logic system (not shown) via cable 42. Mounting of the stator ring to the axle by insert 36 and connection of the electrical connectors 38, 40 are adequately described in the related applications incorporated by reference herein and described above.

In addition, where required, stator ring 238 as illustrated in FIG. 5, may accommodate elongated point sensor 278 of the type illustrated in FIG. 6, and the point sensor may be secured to ring 238 by straps 287 so that pole pieces 280 are 180° diametrically opposed and as further illustrated in FIG. 4, when ring 238 is mounted on axle 212, the pole pieces are directed radially outwardly toward and in simultaneous radial alignment with either rungs 276a or sots 276b of ladder 276 of annular rotor 228 including hub cap 222 secured on wheel 214. Coil leads 282a, 282b are directed to cable 244 for ultimate connection to a logic system. Mounting of stator ring 238 to axle 212 via retainer ring 240 is accomplished as adequately described in the related applications incorporated by reference herein and described above.

The foregoing describes a radially directed point sensor assembly provided for alternate axle connections.

Having thus described the invention in its best embodiment and mode of operation, that which is desired to be claimed by Letters Patent is:

1. A vehicle wheel speed sensor comprising:
 a. annular rotor means mounted for rotating adjacent and relative to the axle; and
 b. stator means mounted on the axle and including point sensor means having pole pieces 180° diametrically opposed and directed radially outwardly toward and in radial alignment with the annular rotor means for proximate electrical association therewith, including:
  1. an elongated point sensor cartridge;
  2. the pole pieces are exposed at opposite ends of the cartridge;
  3. coil means for annular relationship with each pole piece; and
  4. means for magnetically interconnecting the pole pieces.

2. The sensor of claim 1 wherein:
 the pole pieces, coil means and magnetically interconnecting means are encapsulated in relative fixed relationship within the cartridge by a synthetic material.

3. A vehicle wheel speed sensor comprising:
 a. annular rotor means mounted for rotating adjacent and relative to the axle; and
 b. stator means mounted on the axle and including point sensor means having pole pieces 180 degrees diametrically opposed and directed radially outwardly toward and in radial alignment with the annular rotor means for proximate electrical association therewith, the point sensor means including:
  1. a plurality of point sensor cartridges;
  2. each cartridge having a pole piece exposed at one end thereof;
  3. each cartridge having coil means for annular relationship with each pole piece;

4. each cartridge having a magnetic element in abutting relationship with each pole piece; and
5. the pole piece, coil means and magnetic element are encapsulated in relative fixed relationship within the cartridge by a synthetic material.

4. In combination with a vehicle wheel antilock system of the type including a wheel speed sensor, the sensor mounted on an axle adjacent at least one of the vehicle wheels, the sensor having an annular rotor and a stator and including a generally annular stator mounting ring carrying a first portion of a varying electrical signal generating means in cooperation with a second portion of the varying electrical generating means carried by the rotor, the improvement comprising:
   a. point sensor means including pole pieces 180° diametrically opposed and directed radially outwardly toward and in radial alignment with the annular rotor for proximate electrical association therewith, means further including:
      1. an elongated point sensor cartridge;
      2. the pole pieces are exposed at opposite ends of the cartridge;
      3. coil means for annular relationship with each pole piece; and
      4. means for magnetically interconnecting the pole pieces.

5. The combination of claim 4 wherein:
the pole pieces, coil means and magnetically interconnecting means are encapsulated in relative fixed relationship within the cartridge by a synthetic material.

6. In combination with a vehicle wheel antilock system of the type including a wheel speed sensor, the sensor mounted on an axle adjacent at least one of the vehicle wheels, the sensor having an annular rotor and a stator and including a generally annular stator mounting ring carrying a first portion of a varying electrical signal generating means in cooperation with a second portion of the varying electrical signal generating means carried by the rotor, the improvement comprising:
   a. point sensor means incuding pole pieces 180° diametrically opposed and directed radially outwardly toward and in radial alignment with the annular rotor for proximate electrical association therewith, the point sensor means further including:
      1. a plurality of point sensor cartridges;
      2. a pole piece exposed at one end thereof;
      3. coil means for annular relationship with each pole piece;
      4. a magnetic element in abutting relationship with the pole piece; and
      5. the pole piece, coil means and magnetic element are encapsulated in relative fixed relationship within the cartridge by a synthetic material.

7. A vehicle wheel speed sensor comprising:
a. a hub mounted on a wheel for rotating adjacent and relative to an axle;
b. annular rotor means mounted in the hub for rotation therewith;
c. an annular stator mounting ring mounted on the axle;
d. point sensor means mounted on the ring including pole pieces at the periphery of the ring and directed radially outwardly toward and in radial alignment with the annular rotor for proximate electrical association therewith; and
e. the point sensor means comprises a pole piece including:
   1. a disc-like portion having opposite axially spaced sides and a peripheral side; and
   2. an elongated portion extending from one of the axially spaced sides concentric with the perhiperal side;
f. coil means annularly provided about the elongated portion in abutting relationship with the elongated portion and the one axially spaced side; and
g. magnetic means in abutting relationship with the other of the axially spaced sides.

* * * * *

UNITED STATES PATENT OFFICE
CERTIFICATE OF CORRECTION

PATENT NO. : 3,998,298
DATED : December 21, 1976
INVENTOR(S) : Joseph E. Fleagle It is certified that error appears in the above–identified patent and that said Letters Patent are hereby corrected as shown below:

Column 1, line 53, after "rotor" insert -- rotates --. Column 2, line 39, after "appear" insert -- to have inherent advantages over axially spaced sensors, - -; line 48, after "spaced" delete -- radially --. Column 3, line 20, "elvation" should be -- elevation --; line 21, "are" should be -- as --; line 24, after "point" insert -- sensor --; line 28, after "sensor" delete "f" and insert -- of --. Column 5, line 19, "portons" should be -- portions --; line 55, delete "and" and insert -- end --; line 67, delete "200" and insert -- 220 --. Column 7, line 13, after "material" insert a period -- . --; line 68, "directly" should be -- directed --. Column 8, line 19, "sots" should be -- slots --. Column 9, line 19, after "therewith," insert -- the point sensor --. Column 10, line 1, "incuding" should be -- including --.

Signed and Sealed this

Twenty-ninth Day of March 1977

[SEAL]

Attest:

RUTH C. MASON
Attesting Officer

C. MARSHALL DANN
Commissioner of Patents and Trademarks